United States Patent [19]

Maurer et al.

[11] Patent Number: 4,798,559
[45] Date of Patent: Jan. 17, 1989

[54] AUTOMATIC OVERLOAD CLUTCH STRUCTURE

[75] Inventors: Ruprecht Maurer; Karlheinz Timtner, both of Bad Homburg, Fed. Rep. of Germany

[73] Assignee: Ringspann Albrecht Maurer KG, Bad Homburg, Fed. Rep. of Germany

[21] Appl. No.: 5,483

[22] Filed: Jan. 20, 1987

[30] Foreign Application Priority Data

Jan. 25, 1986 [DE] Fed. Rep. of Germany ....... 3602282

[51] Int. Cl.⁴ ............................................. F16D 7/04
[52] U.S. Cl. ..................................... 464/38; 192/56 R
[58] Field of Search .................... 192/56 R, 114 R; 464/30, 37, 38

[56] References Cited

U.S. PATENT DOCUMENTS

| 998,615 | 7/1911 | Huneke | 464/38 X |
| 3,927,537 | 12/1975 | Anderson et al. | 464/37 X |
| 4,062,203 | 12/1977 | Leonard et al. | 464/38 |
| 4,420,072 | 12/1983 | Treffinger et al. | 464/38 X |
| 4,593,800 | 6/1986 | Ness et al. | 192/56 R |

FOREIGN PATENT DOCUMENTS

| 3402860 | 8/1985 | Fed. Rep. of Germany . | |
| 184639 | 7/1963 | Sweden | 464/38 |
| 524023 | 8/1976 | U.S.S.R. | 464/38 |
| 1483331 | 8/1977 | United Kingdom . | |

Primary Examiner—Daniel P. Stodola
Attorney, Agent, or Firm—Frishauf, Holtz, Goodman & Woodward

[57] ABSTRACT

To provide a compact clutch, two clutch parts (1, 2; 44,54,55,73,74) are located in axially fixed position on respective driving and driven shafts. The clutch can be automatically disengaged upon transfer of excessive torque, by including bolt elements (16,61) which are positioned circumferentially around one of the clutch elements (2) and parallel to the axis of rotation (17,60) of the clutch, the bolt elements carrying directly, or engaging respectively tooth or tooth gap elements which are shiftable axially against a bias force, for example provided by a spring (22). The tooth or tooth gap elements are rotatable about the longitudinal bolt axis by a limited angle, which angle is slightly above a relative angle of rotation of the clutch parts upon disengagement due to overload, so that the respective flanks of the tooth elements, engaged with tooth gap elements—or tooth gaps formed in the other clutch part—will remain in continuous engagement just until disengagement of the clutch to thereby provide extensive surface engagement contact between the respective clutch parts.

23 Claims, 5 Drawing Sheets

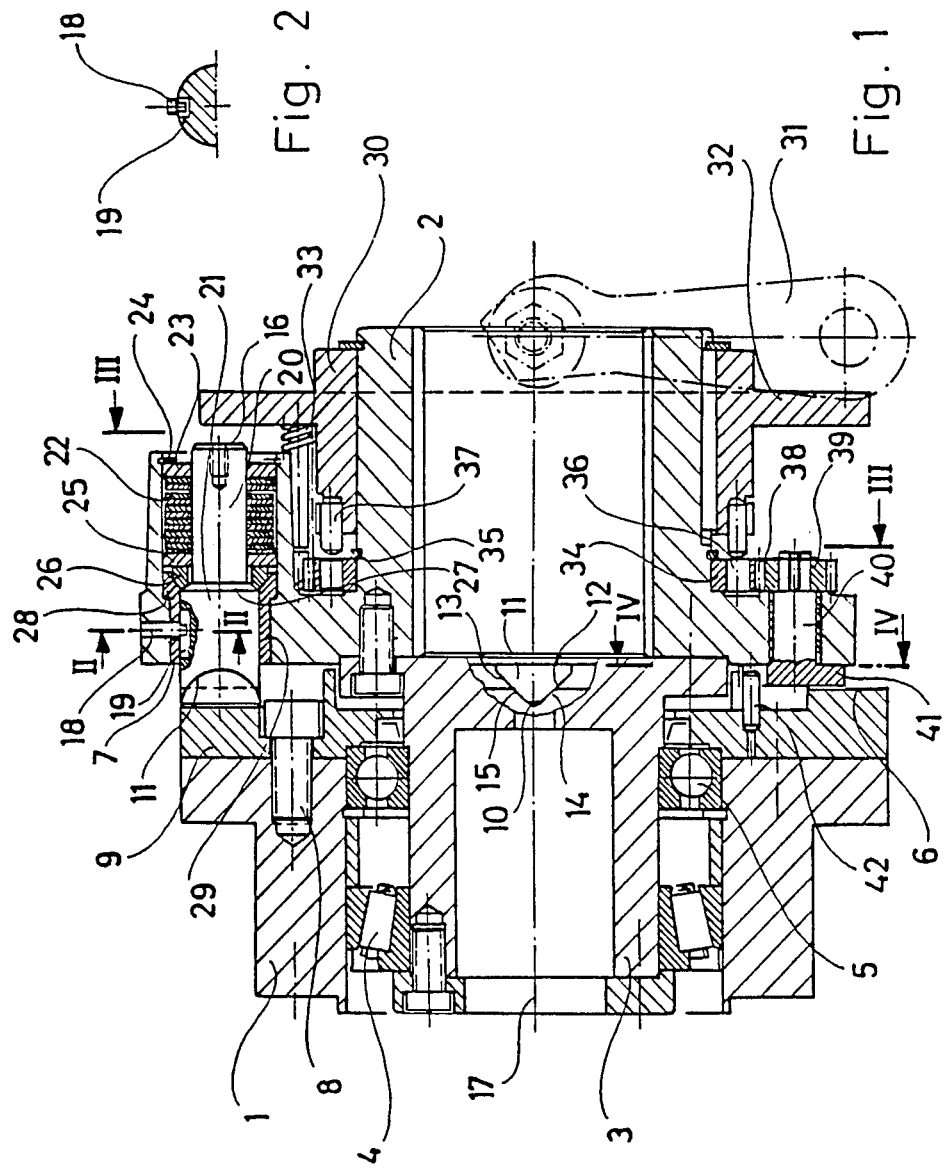

AUTOMATIC OVERLOAD CLUTCH STRUCTURE

REFERENCE TO RELATED PATENTS

The disclosures hereby incorporated by reference:
U.S. Pat. No. 3,927,537, Anderson and Manusco
U.S. Pat. No. 4,062,203, Leonard and Taylor

REFERENCE TO RELATED PUBLICATIONS

German Patent Disclosure Document DE-OS 34 02 860, Mayr and Dasser.

REFERENCE TO RELATED APPLICATION

U.S. Ser. No. 07/005 485, filed Jan. 20, 1987, by the inventors hereof.

The present invention relates to an automatic overload clutch, that is, a clutch which disengages if the transfer torque exceeds a predetermined value, can be constructed in compact form, and in which the clutch components or elements can maintain predetermined angular or rotational alignment. The term "rotational alignment" as used herein is intended to convey the meaning that the clutch elements are reengaged, for example, only after one of the clutch elements, for example, a driven element, has rotated over a predetermined angle which may include a predetermined number of turns or revolutions.

BACKGROUND

Clutches in which two clutch elements can disengage when the torque being transferred exceeds a predetermined value are known. Usually, one of the clutch halves, or parts or components thereof, are shifted axially, or radially, against a spring force, which spring force determines the overload level of the clutch. Clutches of this type are used to protect machines and other devices and plants against overload. The torque being transferred is limited at a suitable position within the drive train of the machine or device, so that it cannot be overloaded and no damage can result. Inter-engaging overload clutches, that is, positive drive clutches which can disengage upon overload have a distinct advantage with respect to friction clutches. The friciotnal value of friction clutches is variable and difficult to determine. Positive engagement clutches, thus, can be set for comparatively determined and precise overload torque values, without relying on the uncertain frictional value with respect to maximum transmitted torque.

A typical engagement arrangement of the clutch halves utilizes facing teeth, or gear-like elements which, upon disengaging of the clutch, disengage from each other. Disengagement is effected by shifting at least one of the two clutch elements, or, by shifting the teeth or tooth gaps relatively to each other. Other types of positive engagement clutches, for example claw clutches are known and used.

After the clutch is disengaged due to an overload, the clutch usually remains in disengaged position until manually reengaged. Manual reengagement is effected by shifting the movable clutch element to again obtain interengagement of the clutch parts with respect to each other. The shift movement is usually axial.

Upon disengagement of one clutch element from the other, and resulting disengaged position of the clutch elements, the clutch elements can be reengaged precisely provided that the interengaging elements fit against each other, in other words, that teeth formed on one clutch element, for example, fit into tooth gaps of the other one.

In known overload clutches, facing teeth are usually pressed by axial force, usually spring force, against matching tooth gaps. The torque being transferred depends on the engagement angle of the teeth and the axial force, which tends to retain the teeth against each other, against which the torque acts to separate the teeth. As soon as the torque-dependent axial force exceeds the predetermined maximum force, the axially shiftable clutch moves until the teeth come out of engagement; the clutch, thus, will spin, and hence disconnect torque drive.

Clutches of this type usually have essentially flat surfaces which are engaged with each other, the extent of inter-engagement of the surfaces depending on the torque to be transferred. The flat surface engagement, for example of adjacent flanks, is lost as the clutch tends to overrun, due to excessive torque. The reason therefor is that the axial movement of the switchable or movable clutch half rotates, as well as moves axially, determined by the angle of the flanks of engaged surfaces. Consequently, the associated flanks shift with respect to each other and surface engagement is lost. At a limiting position, when the clutch is about to disengage, the flanks are effectively in engagement only at the outer edges of the teeth, so that design engagement of flank surfaces is lost and changes to effectively only edge engagement. Upon disconnection of the clutch, which occurs, of course, under maximum loading, or overloading conditions, the engagement forces of these edges of the flanks lead to substantial wear and tear of the teeth, resulting in decrease of the lifetime of the clutch, particularly if overload conditions arise frequently. Furthermore, the end portions of the respective teeth tend to deform, reducing the reliability and adherence to design parameters of the clutch.

Clutches which are designed to transfer high torques require an arrangement which permits axial movement of one clutch half with respect to the other counter a resetting force. The space requirement for such clutches is substantial. To transfer high torques, the reset force must be substantial and, the already large clutch structure requires, additionally, further space for strong reset springs capable of applying the necessary torque transmitting and resetting force.

Clutches which contain many teeth and tooth gaps in inter-engagement with each other must be made very accurately; otherwise, and based on manufacturing tolerances, the loading carried by the respective teeth beocmes non-uniform which further detracts from clutch operation in accordance with design parameters. The size of the clutch structure frequently prevents locating the clutch at the most desirable positions; particularly in cases of high torque transfer it is desired to place the clutch as closely as possible to the apparatus which is to be protected against overload. A large clutch structure frequently cannot be accommodated close to its best and most desired location.

THE INVENTION

It is an object to provide an overload clutch which can transfer high torques, that is, which can be subjected to high torque loading while having a substantially lower volume than prior art clutches, and in which inter-engaging tooth and tooth gap arrangements of two clutch halves are so constructed that all engaged flanks carry the full load, and remain in surface engagement with each other, particularly during the disconnect operation, while still retaining the advantages of a simple, reliable structure.

Briefly, two clutch parts are provided, located to be axially immovable with respect to each other. One of the clutch parts carries tooth elements, the other one gap elements. At least one of the elements, for example the tooth elements, are constructed as bolts or bars, located parallel to the axis of rotation of the clutch, for example distributed about the circumference of a central core. The bolt elements are axially shiftable against the force of a spring, and so located that the teeth and gaps inter-engage. The respective tooth or gap elements, formed by the bolts, not only are longitudinally slidable but, additionally, are rotatable about the longitudinal bolt axis by a limited angle which is up to slightly above a relative angle of rotation of the clutch parts with respect to each other when the clutch parts disengage. This slight angle permits continued surface engagement of the teeth and tooth gaps. The bolts are subjected to a biasing force, typically provided by a spring, so that the inter-engaging tooth and tooth gap structures will be pressed together.

The teeth may be projecting elements, the tooth gaps formed at the ends of bolts, for example with a V-shaped cut.

The structure has the advantage that the clutch parts need not be moved axially—since the bolts can be moved axially independently of the clutch parts, so that the space required for the clutch structure is reduced.

The structure has the additional advantage that the rotatability of the bolts ensures that the tooth and tooth gap arrangements, forming flanks of the clutch teeth, remain in surface engagement upon disconnection, since the respective clutch element can rotate with the relative rotation of the clutch parts with respect to each other as they disconnect. This arrangmeent prevents edge engagement, only, of the clutch part surfaces, and ensures high loading capability of the clutch.

Basically, the axial shiftability and rotatity of paired teeth or tooth gaps could be distributed both over the paired teeth and tooth gaps. Frequently, it will be desirable to provide for the respective axial shifting and rotational or tipping movement on only one of the parts, typically of the engagement element which carries the tooth, so that only one of the bolts has to be both axially shiftable and rotatable.

Material, as well as manufacturing requirements for the respective parts can be reduced. The teeth, previously usually made on large structures and requiring especially hardened components are no longer required, since the teeth can be made and formed at the ends of the bolts, for example made of high strength steel, rather than the most expensive special materials.

The bias force means which provides the reset, or clutch disengagement counter-force do not require additional axial space, since the respective bolts can be individually spring-loaded. Space therefor is usually available within the respective clutch part and a plurality of springs can readily be distributed circumferentially around the clutch and about the respective bolts.

The limited movability of the bolts, both axially as well as rotatably, ensures that all tooth-tooth gaps pairs will carry a proportionate load, since any axially shiftable bolt is independently shiftable with respect to another one; likewise, the rotational movement of any one bolt is independent of another one. Thus, load-dependent movement of the respective bolts is independent, and there is no constraint to have them move all conjointly. Consequently, manufacturing tolerances will not have an effect on the particular bolts, and upon manufacture of the clutch, the requirements for tolerances regarding the tooth-tooth gap pairs is reduced, thus substantially reducing manufacturing costs of an overload disconnect clutch.

The two clutch halves, one having teeth and the other tooth gaps, can be so arranged that the clutch parts face each other with oppositely located surfaces. It is, however, also possible to form one clutch part to overlap the other, for example by forming a projecting sleeve with a radially inwardly or outwardly projecting flange, and placing the teeth and tooth gaps on both sides of the overlapping part. This arrangement has the advantage that the disengagement force which is applied to the bolts located on only one of the clutch halves can be doubly used. The number of tooth and tooth gap interengagements can be doubled, without substantially increasing space requirements, resulting in doubling of the torque which can be transferred before disengagement of the clutch. The structure has the additional advantage—particularly for high loaded clutches—that the clutch halves need not be particularly axially supported, since the inter-engagement of the tooth-tooth gaps of the overlapping clutch halves are so arranged that each half is directed towards the other, so that the clutch elements, within each other, provide for necessary axial support.

Various modifications and changes can be made when using a structure with an overlapping clutch part. The arrangement of the teeth and tooth gaps can be varied, using both fixed, or axialy shiftable tooth, or tooth gap elements. Tooth-gap elements, as noted above, may be shiftable both with notches cut therein to form a gap into which a projecting tooth element can engage. It has been found particularly suitable to so arrange the clutch that one clutch element carries fixed tooth gaps and on the other side tooth gaps which are formed by shiftable bolts; and the other clutch half will have corresponding teeth formed on bolts which are shiftable parallel to the axis of the clutch and formed with the teeth projecting from both ends. These double-tooth bolts are rotatable about the aforementioned limited angle of rotation, as well as being axially slidable. Thus, the tooth gaps are retained in one clutch part which overlaps the other with radially inner or outer flange elements; the tooth gaps are shiftable on one side, so that the tooth gaps, for example formed on shiftable bolts, can be subjected to the biasing force to provide a common clutch holding force for the teeth formed on the shiftable bolts. The other clutch half, which is overlapped by the first one, only carries the teeth, in pairs, and on the respective end faces of the bolt, which is axially shiftable. It has the task of providing for the limited rotation about the bolts axis with respect to the facing tooth gaps, so that the tooth gaps, although being axially shiftable, can be guided to move only in axial movement, but without rotary movement, which facilitates guiding of the tooth gap elements.

The arrangement has the additional advantage to be readily able to vary the respective materials of which the teeth or tooth gap elements are made, or with which they are coated, so that the engaging elements can be suitably matched for design load carrying capability. For example, the engaging coupling or clutch parts may be made of bronze or plastic, in which the plastic material preferably is a fabric soaked in hardened or cured phenol resin. This substantially reduces the cost of the clutch parts, reduces their weight, and reduces the possibility of rusting and possible freezing, or rusting-together of movable parts within the clutch.

DRAWINGS

FIG. 1 is a lateral side view of an overload clutch, sectioned along line I—I of FIG. 3;

FIG. 2 is a fragmentary view along the section line II—II of FIG. 1;

DETAILED DESCRIPTION

Figure 3:
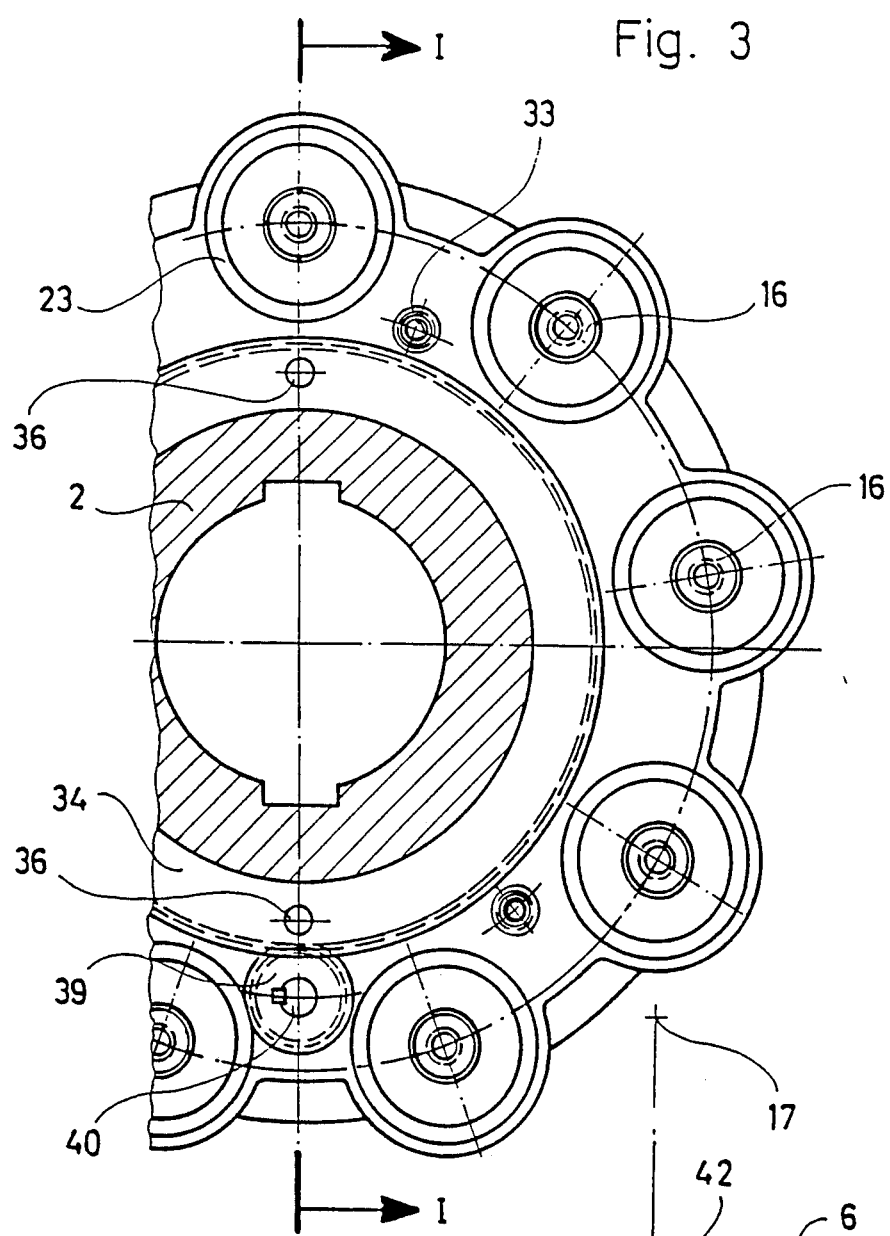
FIG. 3 is a fragmentary view of the clutch along section line III-III of FIG. 1.

An overlaod clutch has two clutch parts 1 and 2 (see FIG. 1) which are positioned coaxially, and relatively rotatable with respect to each other; they are axially fixed. Clutch part 2 has a projecting portion 3 on which a roller bearing 4 and a ball bearing 5 are located, to permit rotation of clutch part 1 with respect to clutch part 2.

The clutch parts can be connected, respectively, to a driving shaft (not shown) and to a torque accepting, or driven shaft, likewise not shown.

The clutch parts 1, 2, face each other with end facing surfaces 6,7. The end facing surface 6 of the clutch part 1 is formed by a ring 9, secured with screws 8 on the clutch part 1 itself. The ring 9 is formed with V-shaped radially directed recesses or cuts 10, uniformly distributed over the circumference, and forming tooth gaps. Teeth 11, carried by the clutch part 2 engage in the gaps 10. The teeth 11 are shaped to match the tooth gaps 10. The forward edge is V-shaped and, thus, defines flat inclined surfaces or flanks 12,13. When the clutch is engaged, the flanks 12,13 engage matching similar flat flanks 14,15 which define the tooth gaps 10.

The teeth 11 are formed on bolts 16, located on the clutch part 1 and facing the clutch part 2. The bolts 16 are oriented parallel to the axis of rotation 17 of the clutch parts and they are rotatable as well as axially shiftably located in the clutch part 2. The rotatability, as well as the axial shiftability of the bolts 16, is limited by engagement pins 18 (see FIG. 2) located in the clutch part 2, and engaging in longitudinal grooves 19 of the bolt 16. The length of the grooves 19 corresponds to the axial shifting path which is required by the bolt 16 in order to permit the teeth 11 to be relieved from engagement with the tooth gaps 10. The grooves 19 are wider, in circumferential direction, than the thickness of the pins 18. The play, or difference in dimension is such that the bolts, upon disengaging of the clutch, can slightly tip or tilt, with respect to engagement of the bearing tooth flank on the engaging bearing flank of the gap, and formed by mutual rotation of the coupling halves or parts 1,2. Thus, the respectively load bearing flanks or surfaces of the tooth gaps 10 and of the teeth 11 will remain in engagement as the clutch disengages, during the entire disengagement time or process, that is, will remain in surface engagement, so that edge engagement, or edge stresses are eliminated. Yet, the spacing is not so wide that the bolts can twist to the extent that the direction of the teeth 11 no longer fits into the gaps 10, which would be undesirable upon reengagement of the clutch.

The belts 16 can include a surface which is of a material different from the clutch parts in contact or engagement with the surface of the bolts; for example the different surface may comprise bronze or a plastic such as a fabric soaked in phenol resin.

The bolts 16 have a rear part 20 which has a lesser diameter than the forward part 21—see FIG. 1. A dish or cup spring stack 22 surrounds the rear part 20. The cup spring arrangement is retained by a washer 23 which, in turn, is retained in the clutch part 2 by a C-expansion ring 24. An intermediate engagement ring or washer 25 is provided, located at the left side of the spring assembly 22—with respect to FIG. 1, followed by a support ring 26 which is engaged on the bolt 16. The engagement is via a conical surface 27, which forms a transition between the wider diameter part 20 and the thinner diameter part 21 of the bolt 16. The angle of inclination of the conical portion 27 is matched to the forward edge of the support ring 26. The bolt 16 is received in a bore 29 in the clutch part 2. The bore 29 has a conical enlargement which matches a conical enlargement formed on the support ring 26. The support ring 26 is capable of radial expansion, for example by being constructed of a plurality of segments, distributed about the circumference of the bolt 16.

Clutch Operation:

Under normal, engaged position, bolts 16 are spring loaded by the spring 22 in the direction towards the clutch part 1. Depending on the force of the springs 22, teeth 11 are held in tooth gaps 10, until the torque being transferred by the clutch exceeds the design transfer torque.

When the design transfer torque is exceeded, spring 22 is overstressed, and the engaging flanks of the teeth 11 will ride up on the paired flanks of the tooth gaps 10. The function in accordance with which the teeth will ride up, and thus the course of the torque upon disengaging of the clutch can be determined by the inclination of the cone 27 on the one hand, and the conical expansion 28 on the other, along which the support ring 27, by radially expanding, will ride up as the spring 22 compresses. When, finally, upon this rising up, a radial expansion of the support ring 26 has been reached in which the inner diameter thereof corresponds to the outer diameter of the part 21 of the bolt 16, the bolt 16 can slip towards the right—with reference to FIG. 1—with its part 21 into the support ring 26. The bolt 16 then will have applied thereto only a radially inwardly directed clamping force of the support ring 26, but no longer an axial force due to the spring 22. The instant of time at which the part 21 of the bolt 16 can slip into the now expanded support ring 26 corresponds to the instant of time in which the respective tooth 11 comes free from the respective tooth gap 10, associated therewith.

Reengaging Mechanism for the Disengaged Clutch:

When the cluth is disengaged, bolts 16 will extend beyond the end face of the clutch part 2 with the ends remote from the engagement teeth 11. In order to reengage the clutch, an axially shiftable engagement or switching ring 30 can be moved axially towards the left—with respect to FIG. 1—by operating a handle 31, until a flange 32 on the ring 30 engages the bolts 16 to move the bolts 16 in the direction towards the clutch part 1. The movement of the engagement ring 30 can be spring-loaded, that is, counter the pressure of one or more circumferentially located springs 33.

As claimed in our copending application Ser. No. 07/005485 filed Jan. 20, 1987, re-engagement is possible only when the clutch parts 1 and 2 have a predetermined relative angular or rotary relationship. For example, a relative rotation of 180° can be commanded, or a plurality of revolutions, and/or fractions of revolutions. In accordance with the present invention, the engagement of the clutch thus is angularly controlled and determined.

Figure 4:
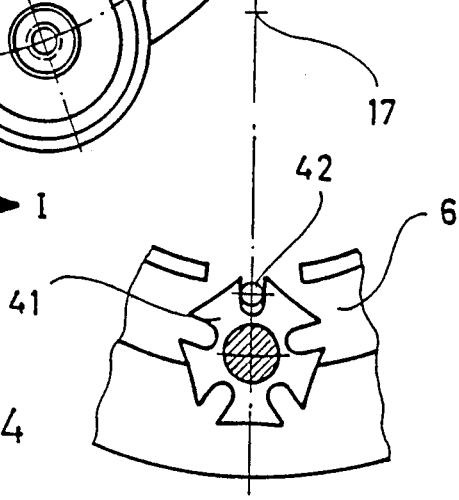
FIG. 4 is a fragmentary view along section line IV—IV of FIG. 1.

The reengagement arrangement includes a locking element in form of a locking ring 34, having external gear teeth 38 thereon. The gear teeth 38 are coupled to the pinion 39 which is rotatably retained on the clutch part 2. Pinion 39 is fixed on a shaft 40, rotatable parallel to the axis 17 of the clutch parts 1,2. The other end of the shaft 40 carries an escapement wheel 41—see FIG. 4—of an indexing mechanism which cooperates with a lantern pin 42, secured to the ring 9 on the clutch part 1. The operation of the pin wheel—escapement gear combination is well known, and need not be described in detail.

The locking ring 34 is rotatable on the clutch part 2, but axially retained in position by a snap C ring 35. The locking ring 34 is formed with two diametrically oppositely positioned axial bores 36 into which, when the clutch parts are in proper engagmenet, two key elements in the form of diametrically oppositely positioned pins can fit, the pins 37 being secured to the engagement ring 30 and facing the locking ring 34.

Operation of Angular Engagement Lock:

The escapement wheel 41 is rotated by a division, in the present case by an angle of 72°, when the two coupling parts 1,2 have been moved by an angle of 360° with respect to each other; this is best seen by reference to FIG. 3. The bores 36 of the locking ring 34 permit engagement of the clutch parts only when the locking ring 34 has been shifted by an angle of 180°. Thus, by suitably dimensioning the gear teeth on the locking ring 34 and on the pinion 39, it can easily be determined how many relative revolutions the coupling parts 1,2 must carry out before the possibility again arises to reengage the clutch. Reengagement of the clutch presupposes that the pins 37 are immediately opposite the bore 36 when, also, the teeth 11 match the tooth gaps 10. If this is not the case, particularly if the teeth and gear teeth are located about the circumference of the clutch in non-symmetrical arrangement, the coupling or clutch parts must be rotated with respect to each other until both the conditions are met:

(1) teeth 11 on the bolts 16 match the tooth gaps 10; and (2) bores 36 of ring 34 match position of the pins 37.

The number of the necessary relative revolutions, or part revolutions of the clutch parts can readily be calculated by considering the division ratio of the escapement wheel, and the gear teeth of the pinion 39 and gear 34.

The arrangement additionally prevents that the clutch can be reengaged if the matching situation has been exceeded, for example inadvertently. Exceeding the "match" position causes corresponding movement of the locking ring 34. In order to ensure possible reengagement even after comparatively short exceeding of the "match" position, a further lantern pin 42 can be located, in the direction of rotation, beyond the pin 42. This further pin must be considered in the calculation; upon exceeding of the above referred to engagement position, however, it will prevent engagement of the clutch if a "match" position has been exceeded.

When the necessary number of revolutions, or part revolutions, or multiples thereof have occurred, so that a "match" situation occurs between the locking ring 34 and the key pins 37, without, however, the condition pertaining that the teeth 11 match the tooth gaps 10, engagement of the clutch is impossible since the bolts 16, and hence the ring 30 cannot be moved in the direction towards the clutch part 1.

Figure 5A:
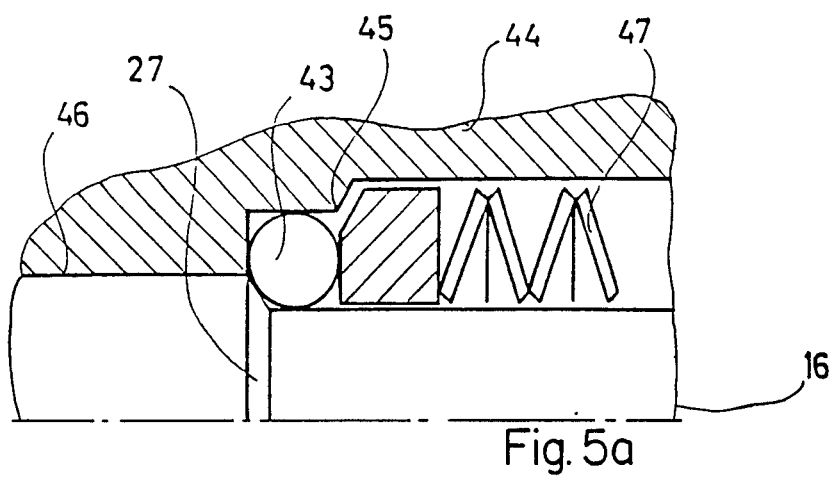
FIGS. 5a and 5b are fragmentary views illustrating a modified embodiment of a portion of the clutch, in which FIG. 5a and FIG. 5b shows an upper and lower part, respectively, with respect to the center line, and illustrate respectively different positions of a clutch bolt.
Figure 5B:
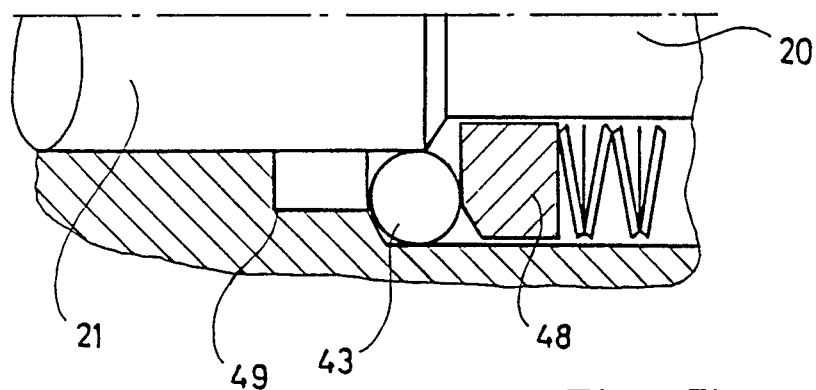

Referring to FIG. 5, which illustrates a different embodiment of the arrangement of the bolt 16 and the cone surface 17 thereon in the bore of the clutch part 2:

The radially expandable ring 16 is replaced by a group of balls 43, located circumferentially around the portion 20 of reduced diameter of the bolt 16. The clutch part 44, which correspond to the clutch part 2, FIG. 1, is formed with a bore 46 which receives the wider portion 21 of the bolt 16. Adjoining the bore 46 is a diametrically enlarged section defining a surface 49 which merges into a conical region 45. Balls 43 are axially loaded to be pressed towards the left by a bias force arrangement, formed, as shown in FIG. 5, by a stack of cup or ring-disks 47, or other equivalent spring elements. An intermediate ring 48 is provided to form an engagement surface for the spring 47. FIG. 5 is shown in split representation, with the upper half—with respect to the drawing—showing the bolt in the leftward position, and the lower half showing the bolt in a right, or retracted position.

The upper half of the illustration in FIG. 5 illustrates the placement of the bolt when the clutch is engaged. The lower half illustrates the placement of the bolt 16 when the clutch is disengaged. As can be clearly seen, the axial distance between the end of the bore 46 and the conical enlargement 45 permits movement of the balls 43 first along the cylindrical surface 49 without any radial deflection thereof. Thus, the balls can ride along the conical section 27 between the thinner portion 20 and the thicker portion 21 of the bolt 16. Only after the bolt has passed the predetermined path defined by the length of the surface 49 and the position of the conical region 45 in the bore in which the bolt is retained, ball 43 can fit into the space formed by the widened bore at the terminal end of the conical enlargement 45, to move radially outwardly and into the position shown in the lower half of FIG. 5. At that position only, the substantially higher frictional forces may occur which are a function of the movement of the balls 43 along the cone 27 and the conical enlargement 45. Movement of the balls along the surface 49 and on the portion 20 of the bolt 16, and along the conical section 27 of the bolt 16 is subject to very little friction, only.

Figure 6:
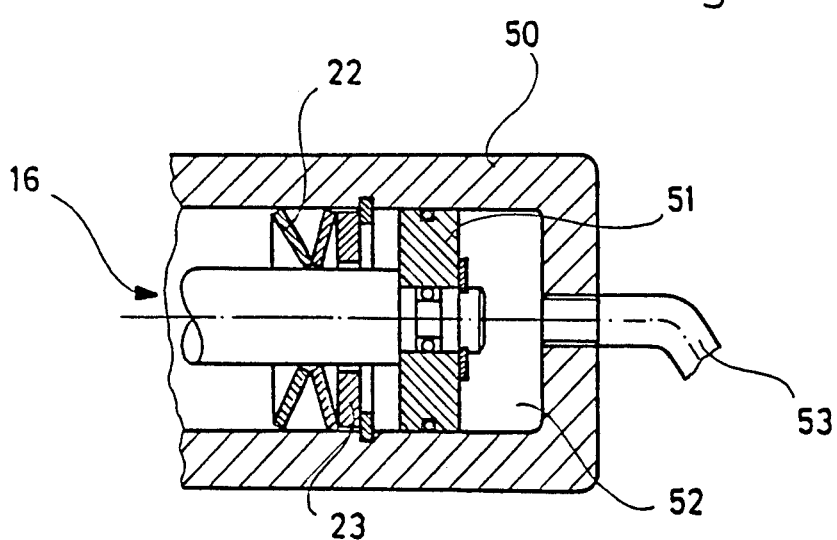
FIG. 6 is an enlarged fragmentary view of a further modified embodiment.

FIG. 6 illustrates another embodiment, useful with the structure of FIGS. 1-4 or, for that matter, with that of FIG. 5 or other structures to be explained. Rather than using a reset ring flange 32 to reset the bolts after disengagement of the clutch—and when the rotational alignment is appropriate—bolts 16 have attached at their rearward end a piston 51, slidable in the cylinder 50, which is attached to the clutch part 2, or may be formed as part thereof. Springs 22 and washer or ring 23 are similar in construction and operation as explained in connection with FIG. 1.

Upon disengagement of the clutch, that is, when the bolt 16 is shifted toward the right (with respect to FIG. 6), the bolts can be reengaged by providing pressurized fluid in the cylinder space 52 through a pressure line 53, to shift the bolt 16 towards the left and, thereby, reengage the clutch.

Figure 7:
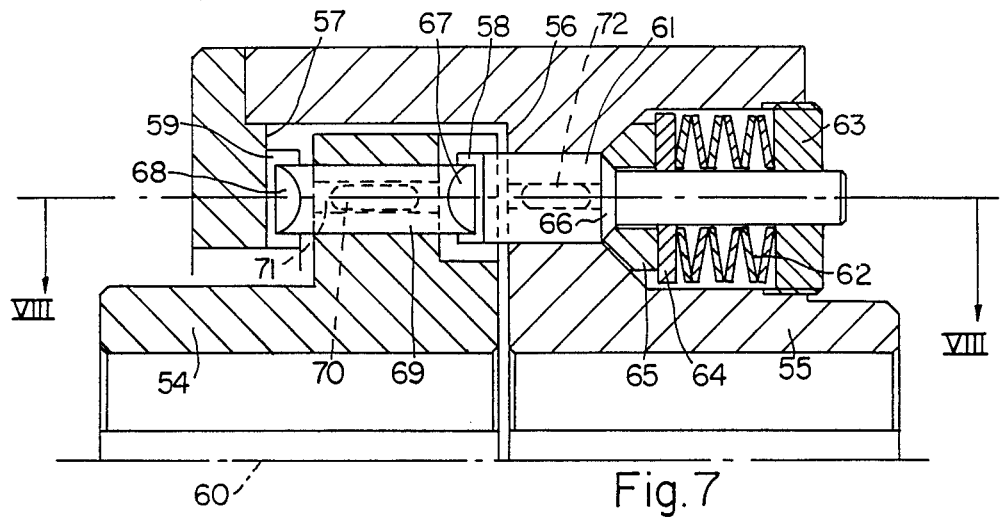
FIG. 7 is a fragmentary axial section of yet another embodiment of the tooth-tooth gap pair combination.
Figure 8:
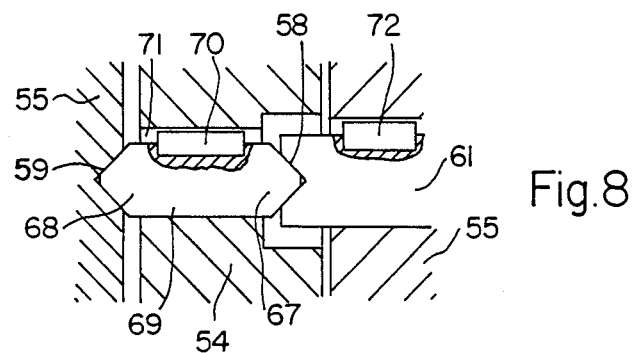
FIG. 8 is a sectional view along line VIII—VIII of FIG. 7.
Figure 9:
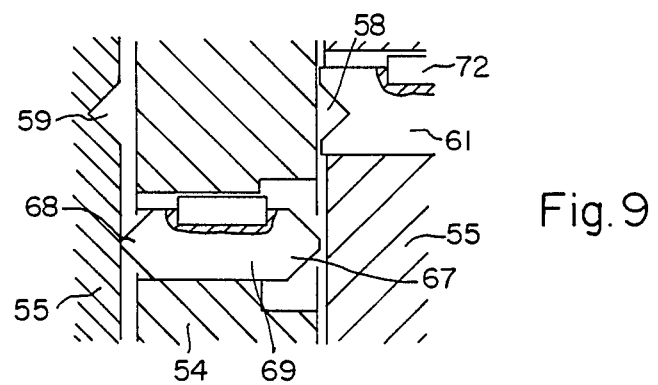
FIG. 9 is an illustration of the arrangement of FIG. 8, with the clutch disengaged.

FIGS. 7, 8 and 9 are fragmentary representations of a modified construction, in which the clutch halves or parts 54,55 are so constructed that clutch part 55 overlaps the clutch part 54 radially outwardly, as well as inwardly, and reaches therearound or thereover. Thus, clutch part 54 will have two end faces which are directly opposite faces 56 and 57 of clutch part 55. The facing sides 56,57 present tooth gaps 58,59, respectively, to the facing sides of the clutch part 54. The tooth gaps 58 are formed in bolts 61, slidable parallel to the axis 60 of the clutch similar to the bolts 16. Bolts 61 are slidable in the clutch part 55. When engaged, bolts 61 are moved to the left—see FIG. 7—to engage clutch teeth 67 formed on a central slidable bolt 69, slidable in the clutch part 54. The tooth gap elements on bolts 61 are urged to the left in FIG. 7 by a bias force provided by cup or washer springs 62. The washer springs 62 are supported at the outside by a fixed ring 63, suitably retained in the clutch part 55, applying their force via an intermediate ring or washer 64 on a support ring 65 which engages a cone 66 on the bolt 61. Cone 66 is formed on the bolt 61 between two sections of different diameter, as seen in FIG. 7. The general arrangement is similar to that described in connection with FIG. 1 and need not be described again. The clutch part 54 carries tooth elements 67,68, formed at the ends of the bolts 69. The bolts 69 are slidable in the clutch part 64 parallel to the axis of rotation of the clutch 60. The bolts 69 are slidable in bores formed in the clutch part 54, and may twist slightly. The bolts 69 include spring 70, movable in grooves 71 in the clutch part 54—see FIGS. 8 and 9—permitting slight twisting or tilting of the bolts 69 and defining the possible twist or tilt or rotary angle. This limited rotatability of the bolts 69 is again provided to retain the flanks of the teeth and tooth gaps in engagement upon disengaging movement of the clutch, described in detail in connection with FIG. 1. Due to the necessary movability or, rather, twistability or rotatability of bolts 69, a similar capability of rotation of the bolts 61 carrying the tooth gaps 58 is not necessary, so that the corresponding groove-and-spring connection 72, shown in FIGS. 7-9, may be left merely as a connection to limit axial sliding movement without, however, permitting rotary movement about an axis coinciding with the longitudinal axis of the respective bolt 61, or bolt element 69.

FIG. 7 illustrates the clutch in engaged condition. FIG. 8 is an enlarged view of the engaged condition of the interengaging tooth and tooth-gap elements, taken along section lines VIII—VIII of FIG. 7, and illustrating the inter-engagement of the teeth and tooth gaps, or tooth recesses, respectively. FIG. 9 illustrates the arrangement of the clutch upon disengaged position. Bolt 69 is shifted towards the right, so that the tooth element 68 is out of engagement from the tooth gap or recess 59; likewise, bolt 61 has been shifted towards the right, so that engagement between the tooth element 67 and the gap or recess 58 has been released. Thus, as can readily be seen, the overall length of bolt 69, together with the teeth carried thereby, must be slightly less than the axial spacing of the facing surfaces 56,57; the operating stroke or moving distance of bolt 61 then must be the sum of the depth of inter-engagement between tooth 67 and gap 58 plus tooth 68 and gap or recess 59.

The clutch described in connection with FIGS. 7 to 9 has the advantage that the inter-engagement between teeth and tooth gaps or recesses of the two clutch halves is doubled, without, however, requiring doubling of the springs 62 and the necessary reset or engagement force arrangement. The clutch has another advantage: the mutual inter-engagement of the tooth-tooth gap pairs of the tooth clutch results in axial forces which, along the circumference, are mutually compensated so that the respective clutch halves need not be supplied with special axial supports to axially fix and secure the clutch parts with respect to each other.

Of course, the clutch of FIGS. 7-9 may have a common reset arrangement as described, for example, in connection with FIGS. 1 or 6. Such a reset arrangement may include, for example, a reset lever and flange 32, or a pressure fluid controlled arrangement acting on the bolts 61.

Figure 10:
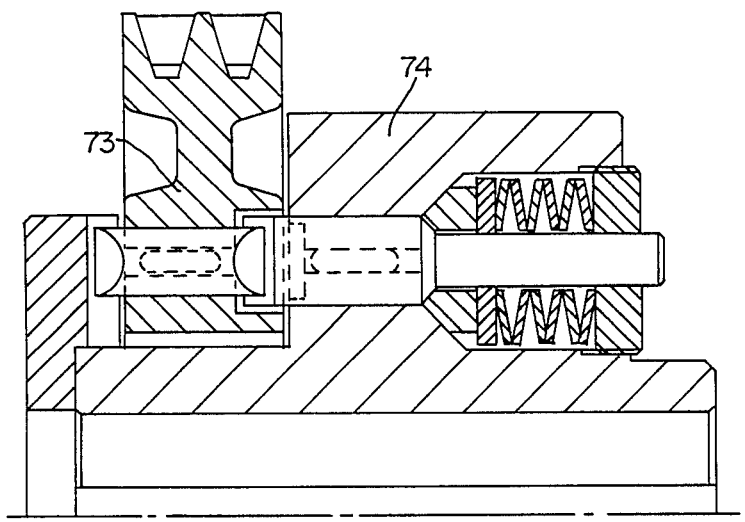
FIG. 10 is a fragmentary axial section illustrating another embodiment of an overload clutch arrangement.
Figure 11A:
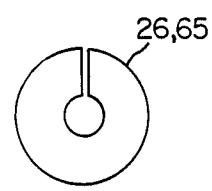
FIGS. 11a and 11b are respective end views of two embodiments of a radially expansible ring.
Figure 11B:
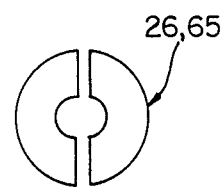

FIG. 7 shows a particularly compact arrangement in which the clutch is integrated with a drive pulley. The clutch half or part 74 engages with the clutch part 73 in overlapped relation, radially inwardly of the clutch part 73 which can be integrated with, for example, a V-belt pulley, rotatably journalled on clutch part 74, as schematically shown, for example, by a lifetime-lubricated bronze bearing ring, and as well known. The operation of the clutch of FIG. 10, for example, upon overload of the clutch part 74 with respect to the V-pulley 73 is similar to that described in connection with FIGS. 7-9 and need not be repeated.

The limited capability to twist, or tilt about an axis coinciding with the axis of the bolts 16,61,69 can be readily obtained by providing an engagement pin in the respective clutch part where the bolt, or bolt elements operate—see FIG. 2—in which a pin 18 engages in a suitable groove, cut parallel to the axis of the respective bolt or bolt element. The groove, as described, is wider than the diameter of the pin, to provide for play in the direction of the circumference of the clutch. Thus, the bolt or bolt element 16,61,69, as required, can carry out axial movement in accordance with the length of the groove and, additionally, a twisting movement about the axis of the bolt. This twisting movement extends over a limited angle which is so dimensioned that the respectively movable part cannot exceed a position which, when the clutch is disengaged, interferes with reengagement of the clutch; in other words, the respectively rotating parts must be in at least approximate radial alignment with respect to the opposite matching part.

The engagement force of the clutch is preferably formed by compression springs which, preferably, are arranged to surround at least a portion of the bolt or bolt element on one clutch part which is to be pressed towards the other one. Cups, or washer- or ring-type springs are particularly suitable.

The bolts which carry the projecting teeth, or tooth gaps or tooth recesses, respectively, preferably have two sections of different diameter. The transition between the diametrically different sections preferably is conical. The associated clutch parts have a bore which guides the bolt section with the wider outer diameter and, further, is formed with a conical expansion which surrounds the clutch path with a narrower diameter. Support elements in form of the support ring 26 (FIG. 1) 65 (FIG. 7) or bores 43 (FIG. 5) are so placed that, when the clutch is engaged, they are in engagement with the cone portion of the respective bolt element. The support parts are radially expandable or movable, for example by being formed as an expansion ring, a segmental ring, or the like, or the balls are movable in a wider groove until the support elements can fit within the enlarged portion of the bore in the respective clutch part over the thicker or wider portion of the bolt, that is, that part of the bolt which has the greater diameter. Suitable intermediate washers are provided to engage the respective support rings, segments or balls with the springs providing the engagement force.

The cone angle of the conical transition zone between the thicker and thinner parts of the bolts or bolt elements on the one hand and the conical enlargement of the bore on the other permit ready matching of the clutch disconnect operation of the respective bolts, and the clutch overall, with respect to design requirements. This is so particularly since the inter-engaging flanks of the teeth and tooth gap or recesses can be considered, particularly upon rotatation of the respective bolt or bolt elements. These flanks depend on the respective use of the clutch. The overall construction thus permits to match the operation characteristics of the clutch to design requirements. Furthermore, the segmental rings or balls can be carried in the wider part of the clutch which is so dimensioned that some interference fit or frictional engagement with the bolt will result so that, upon disengagement of the clutch, the bolts no longer are spring biased, or force biased towards re-engagement; rather, they are held in the respective position by the expanded ring, ring segments or balls, respectively. As can readily be seen—for example considering FIG. 5, when the clutch is in the position shown in the lower half of the figure, movement of the bolt 16 towards the left is restrained by counter-rotation of the clutch 43 so that, unless forcibly moved to the left by the re-engagement mechanism 30-32 (FIG. 1) or fluid pressure (FIG. 6), spring pressure alone will not move the bolt 16 into the re-engaged position.

The enlarged bore in the clutch part carrying the bolts can be fitted immediately against the portion of the bore guiding the larger diameter bolt section. This permits a placement in which the conical enlargement, with respect to the engaged position of the clutch, surrounds the cone of the bolt coaxially from the outside. This permits the disengagement operation for the clutch, simultaneously, moving the support elements—the ring 26 or 65, or the balls 43, radially outwardly.

Friction which occurs in this disengaging operation between the support elements, that is, the rings or the balls, on the one hand and the cone and the conical enlargment ment on the other, is undesirable at the beginning of the disconnect operation. To reduce such initial friction, it is preferable to form the bore in the respective clutch part such that an intermediate cylindrical or prismatic surface 49 is formed between the guide bore 46 and the enlarged portion of the bore. The force which tends to hold the clutch engaged, and which is overcome upon excessive torque, thus is provided essentially entirely by the respective springs and frictional force have hardly any influence thereon.

The arrangement illustrated in connection with FIG. 5 is particularly simple in which the support elements are balls for example ball-bearing balls. As illustrated in FIGS. 1–4 however, the support elements may be a ring 26,65 which is radially expandable, for example by being formed in segments and including conical surfaces for engagement with the cone the bolts 16,61 and on the conical transition surface in the bore of the respective clutch part. The support ring need not be formed by segments, however; depending on the diameter, the support ring may be axially slit ring which can expand circumferentially; a construction in which the ring, however, is formed of a plurality of segments which, each, may carry out their own outwardly directed radial movement is preferred.

The engagement elements to reengage the clutch can be manually operated (FIGS. 1–4) or by means of a pressure fluid, for example, hydraulic or pneumatic pressure. Hydraulic or pneumatic pressure is easily remotely controlled. The arrangement is simple to control since the bolts, when disengaged, can be made long enough so that their ends project beyond a surface of the clutch part 2, so that an engagement flange, preferably spring loaded, and nonrotatable, but axially shiftable, can be used to re-engage the clutch when proper rotational alignment—if such is desired—has been obtained.

In accordance with a preferred embodiment, the clutch can be reengaged only after the clutch parts have been rotated with respect to each other such that teeth and tooth gaps or recesses face each other. Such index, or register position can be determined by suitable markers, by suitably aligned pins and recesses 34,36,35,37 and/or by an additional interlocking arrangement including an indexing system as specifically claimed in the referenced copending application Ser. No. 07/005,485, filed Jan. 20, 1987 by the inventors hereof.

Various changes and modifications may be made and features described in connection with any one of the embodiments may be used with any of the other, within the scope of the inventive concept.

We claim:
1. Compact overload disconnect clutch having
   a pair of clutch parts (1, 2; 44, 54, 55, 73, 74),
   one clutch part being adapted to be coupled to a driving shaft providing driving torque and another clutch part being adapted to be connected to a coaxial driven shaft subject to a loading torque, said clutch parts being formed with facing surfaces (6, 7) including means defining tooth elements (11) associated with one clutch part (2) and means defining tooth receiving tooth gap elements (10) on the other clutch part,
   said tooth and tooth gap elements having matching interengaging flat flanks (12, 13, 14, 15) defining flank surfaces which extend radially and at an inclination with respect to the axis (17, 60) of the clutch to define generally V-shaped flank surfaces,
   wherein
   the clutch parts (1, 2; 44, 54, 55, 73, 74) are positioned to be axially immovable with respect to each other;

at least one of said elements comprises movable bolt elements (16, 61) positioned parallel to the axis of rotation (17, 60) of the clutch and being axially shiftably located on one (2) of said clutch parts, said bolt elements being formed with one of said tooth and tooth gap elements (10, 11) at a side proximate to the facing surface of the other (1) clutch part;

force biasing means (22) are provided acting on the bolt elements (16, 61) located on said one (2) of said clutch parts and urging said bolt elements in a direction towards the other clutch part (1); and wherein at least one (2) clutch part and said at least one of said tooth and tooth gap elements includes means for positioning said at least one of said tooth and tooth gap elements in said one (2) of said clutch parts for limited longitudinal sliding movement therein and for controlled limited rotation about the longitudinal bolt axis by a limited angle, which limited angle extends up to slightly above a relative angle of rotation of said clutch parts with respect to each other upon disengagement of the tooth element from the tooth gap element.

2. The clutch of claim 1, wherein one clutch part (55,74) is formed with an overlapping region, radially overlapping the other (54,73) clutch part;

and wherein the respective tooth element (11) or tooth receiving tooth gap element (10) respectively, are located in axial alignment on the respective clutch parts and are associated, respectively, with said tooth elements, respectively or tooth gap elements.

3. The clutch of claim 2, wherein (FIG. 7) at least one of: the tooth elements (11) and the tooth receiving tooth gap elements (10), comprise axially slidable bar elements (69), said bar elements being engaged by said bolt elements (61) for movement thereby, said bar element being formed with the respective tooth (67,68) and tooth gap (58,59) elements and rotatably positioned for said limited angle, one of said coupling halves (55,74) being formed with fixed tooth gaps (59) at the side overlapping and engaging around the other coupling half (54,73), the bar elements being formed with said tooth elements (67,68) and slidable in the other part (54);

and wherein said bolt elements are formed, additionally, with tooth gap elements facing the tooth elements on the bars, and slidable within the first clutch part.

4. The clutch of claim 1, wherein the bolt elements (16,61) include a surface which is of a material different from the clutch parts in contact or engagement with the surfaces of the bolts.

5. The clutch of claim 4 wherein the material of said different surface comprises bronze.

6. The clutch of claim 4 wherein the material of said different surface comprises plastic.

7. The clutch of claim 4, wherein the material of the different surface comprises a fabric soaked in phenol resin.

8. The clutch of claim 1, wherein the positioning means comprises a longitudinal groove (19) formed in the at least one of the tooth and tooth gap element extending parallel to the longitudinal axis (17, 60) of the clutch, and a fixed engagement pin (18) secured to the associated clutch element (2, 44) engageable in said groove, said groove being wider than the thickness of said pin to permit said relative controlled rotation about the longitudinal bolt axis by said limited angle, while permitting longitudinal sliding of the respective tooth element or tooth gap element or of the bolt element (16), and wherein the length of the groove is at least as long as the axial movement of the respective tooth and tooth gap element when the clutch changes from engaged to disengaged position.

9. The clutch of claim 1, wherein said force bias means (22) comprises a spring (22,47,62) acting on the respective bolt element (16,61) and positioned at the side of the bolt element remote from the respective tooth element or tooth gap element associated with the bolt element.

10. The clutch of claim 9, including means for retaining the respective bolt element in a position withdrawn from projection towards the other clutch element, said means comprising a zone of reduced diameter (20) at the side remote from said other clutch element, and a conical transition zone (27,66) extending toward the reduced diameter;

a guide bore (29,46) formed in the associated clutch part (22,44,55) and a conical enlargement (28,45) formed in the guide bore;

support elements (26,43,65) surrounding the portion of the bolt of reduced diameter which, upon engagement of the clutch, are in engagement with the conical transition zone, said support elements being radially expandable to permit passage of the larger diameter portion of the bolt therethrough;

and abutment means (25,48,64) engaged by said spring and engaging said support elements.

11. The clutch of claim 10, wherein the conical enlargement (28) is located immediately adjacent said guide bore (29), said guide bore being longitudinally dimensioned to guide the portion of the bolt element (16) having the larger diameter.

12. The clutch of claim 11, wherein (FIG. 5) the conical enlargement (45) is axially spaced from the guide bore (46) for guiding the portion of the bolt of the greater diameter;

said one coupling part (44) being formed with a recess (49) of cylindrical or prismatic shape, the support element (43) being received in said receiver.

13. The clutch of claim 10, wherein the support element comprises a plurality of balls located circumferentially around the bolt element.

14. The clutch of claim 10, wherein the support element comprises a radially expandable support ring (25,65) formed with conical facing surfaces to engage the conical transition zone of the bolt element and the conical enlargement (28) formed in said one clutch part (2,44).

15. The clutch of claim 14, wherein said radially expansible ring (26,65) comprises a washer-like support ring having a radial slit.

16. The clutch of claim 14, wherein said radially expansible support element comprises a plurality of sgements distributed, in ring-configuration, about the circumference of the bolt element.

17. The clutch of claim 10, further comprising engagmenet means (30-33,50,51) movably located on said one of the clutch elements to shift the respective bolt elements or tooth or tooth gap elements in engaged direction towards the other clutch part (1) after disengagement of the clutch parts due to overload.

18. The clutch of claim 17, wherein the bolt elements (16, 61) extend from said one clutch part (2, 44, 55) with the end remote from at least one of said tooth and tooth gap elements beyond an end face of said clutch elements which is remote from said facing surfaces (6, 7);

and wherein a reset ring (30) forming part of the engagement means is axially shiftably coupled to said one clutch part and formed with an engagement surface (32) engaging the projecting bolt ends to move the projecting bolt ends inwardly of said one clutch part for reengagement of said clutch parts.

19. The clutch of claim 1 wherein the bolt elements (16,61) comprise a material which is different from the material of the clutch parts in contact or engagement with the surfaces of the bolts.

20. The clutch of claim 19 wherein said material which is different comprises bronze.

21. The clutch of claim 19 wherein said material which is different comprises plastic.

22. The clutch of claim 19 wherein said material which is different comprises a fabric soaked in phenol resin.

23. The clutch of claim 1 wherein said bolt elements (16,61) are positioned essentially uniformly distributed over the circumference of the respective clutch part.

* * * * *